US006994625B2

(12) United States Patent
Falciglia, Sr.

(10) Patent No.: US 6,994,625 B2

(45) Date of Patent: Feb. 7, 2006

(54) SYSTEM AND METHOD FOR PLAYING A MULTIPLE-ROW MATCHING GAME

(76) Inventor: Sal Falciglia, Sr., 386 Highview Ter., Ridgewood, NJ (US) 07450

( * ) Notice: Subject to any disclaimer, the term of this patent is extended or adjusted under 35 U.S.C. 154(b) by 0 days.

(21) Appl. No.: 10/863,166

(22) Filed: Jun. 8, 2004

(65) Prior Publication Data

US 2005/0009593 A1 Jan. 13, 2005

Related U.S. Application Data

(60) Provisional application No. 60/477,447, filed on Jun. 9, 2003.

(51) Int. Cl.

*A63F 13/00* (2006.01)
*A63B 71/06* (2006.01)

(52) U.S. Cl. .................... 463/20; 463/19; 273/143 R; 273/269

(58) Field of Classification Search ............ 463/12–13, 463/16–20, 25, 40–43; 273/292–293, 143 R, 273/139, 269; 700/91–93

See application file for complete search history.

(56) References Cited

U.S. PATENT DOCUMENTS

| | | | | |
|---|---|---|---|---|
| 5,935,002 A * | 8/1999 | Falciglia | .................... | 463/19 |
| 5,971,849 A * | 10/1999 | Falciglia | .................... | 463/16 |
| 6,190,255 B1 * | 2/2001 | Thomas et al. | ............... | 463/20 |
| 6,280,328 B1 * | 8/2001 | Holch et al. | .................. | 463/42 |

* cited by examiner

*Primary Examiner*—Mark Sager

(74) *Attorney, Agent, or Firm*—Carter, DeLuca, Farrell & Schmidt, LLP.

(57) ABSTRACT

The present invention provides a system and method for playing a betting game in which a player selects at least one betting line. The player-selected betting lines correspond to particular cells on a game board. Each cell on the game board is assigned a randomly selected spinner icon. The spinner icons within cells corresponding to a selected betting line are evaluated to determine if a winning condition as defined in a payout table has been achieved. A winning condition occurs when a predetermined minimum number of identical icons in the one or more player-selected betting lines are displayed. The present invention may be configured as a slot machine and provided within a gaming establishment. Additionally, the present invention is also configurable as an online betting game playable over a network or as a user-installable program installable on a personal computer or other such computing device.

20 Claims, 14 Drawing Sheets

SYSTEM AND METHOD FOR PLAYING A MULTIPLE-ROW MATCHING GAME

PRIORITY

The present application is a U.S. patent application claiming priority from a U.S. Provisional Application filed on Jun. 9, 2003 and assigned U.S. Provisional Application Ser. No. 60/477,447, the contents of which are incorporated herein by reference.

BACKGROUND OF THE INVENTION

I. Field of the Invention

The present invention relates generally to games, and more particularly to online, i.e. internet, betting and casino slot machine games. Specifically, the present invention provides for a computer-based system and method for playing a multiple-row casino betting game.

II. Description of the Prior Art

The gaming industry has come to recognize that to sustain long term success it must be constantly innovative in introducing new games and new gambling concepts to the gaming public. One example of this innovating drive can be appreciated with the embrace of the Internet and online gambling by the gaming industry. Presently, most games found in casinos, both brick-and-mortar and online, have centered on the traditional games associated with the gaming industry, i.e. Poker, Black Jack, etc.

The new market for the gaming industry and perhaps most especially the online gaming industry is that group of individuals who find the traditional games too complex or simply not exciting enough. In the drive to attract greater numbers of players, casinos strive to include games that are familiar, simple to understand, engaging, and entertaining.

SUMMARY OF THE INVENTION

The present invention provides a system and method for playing a multiple-row matching game. In one embodiment, the game is configured for play via a casino-type gaming machine in which a player selects a set of lines—i.e. horizontal, vertical, diagonal or any combination—to place a wager on. The player activates the spinners causing random icons to be displayed. The random icons are evaluated for matches and winnings are awarded to the player if the player's selected set of lines contains matching icons as defined in a pay table.

In an alternate embodiment of the present invention, the game play is conducted over the Internet or other suitable network, wherein the player interacts with the game via a personal computer or other device capable of establishing a network connection. In this embodiment, the game is single-player only. Game play is initiated by the player by authorizing a predetermined number of credits from player's account transferred to the game host.

Another alternate embodiment of the invention provides for incorporating the game in a slot machine with game play occurring within a casino or other gaming establishment. In this embodiment as well, the game is single-player only. Game play is initiated by the player inserting a predetermined number of tokens, swiping a prepaid card, or other form of payment.

Another embodiment provides play of the game via a pre-printed lottery card having a plurality of concealed cells. One can scratch off the material concealing the cells to reveal icons and to determine if a predetermined number of matches have been made for identical icons.

BRIEF DESCRIPTION OF THE DRAWINGS

These and other features, aspects, and advantages of the present invention will become better understood with regard to the following description, appended claims, and accompanying drawings wherein:

DESCRIPTION OF THE PREFERRED EMBODIMENTS

The following describes a preferred embodiment and the rules for playing of the game of the present invention.

A preferred embodiment of the present invention, as shown in FIGS. 1*a–k*, provides an interface 100 wherein a plurality of spinners 101 having multiple cells 103 arranged in a row/column configuration. Additionally, the interface 100 includes a plurality of betting-line buttons 104, designating various betting options. The interface 100 also includes a number of indicators 103*a* configured to show the selected betting-lines. This embodiment may be configured as a program installable and playable on a personal computer or game station, or playable online over a network.

Figure 1A:
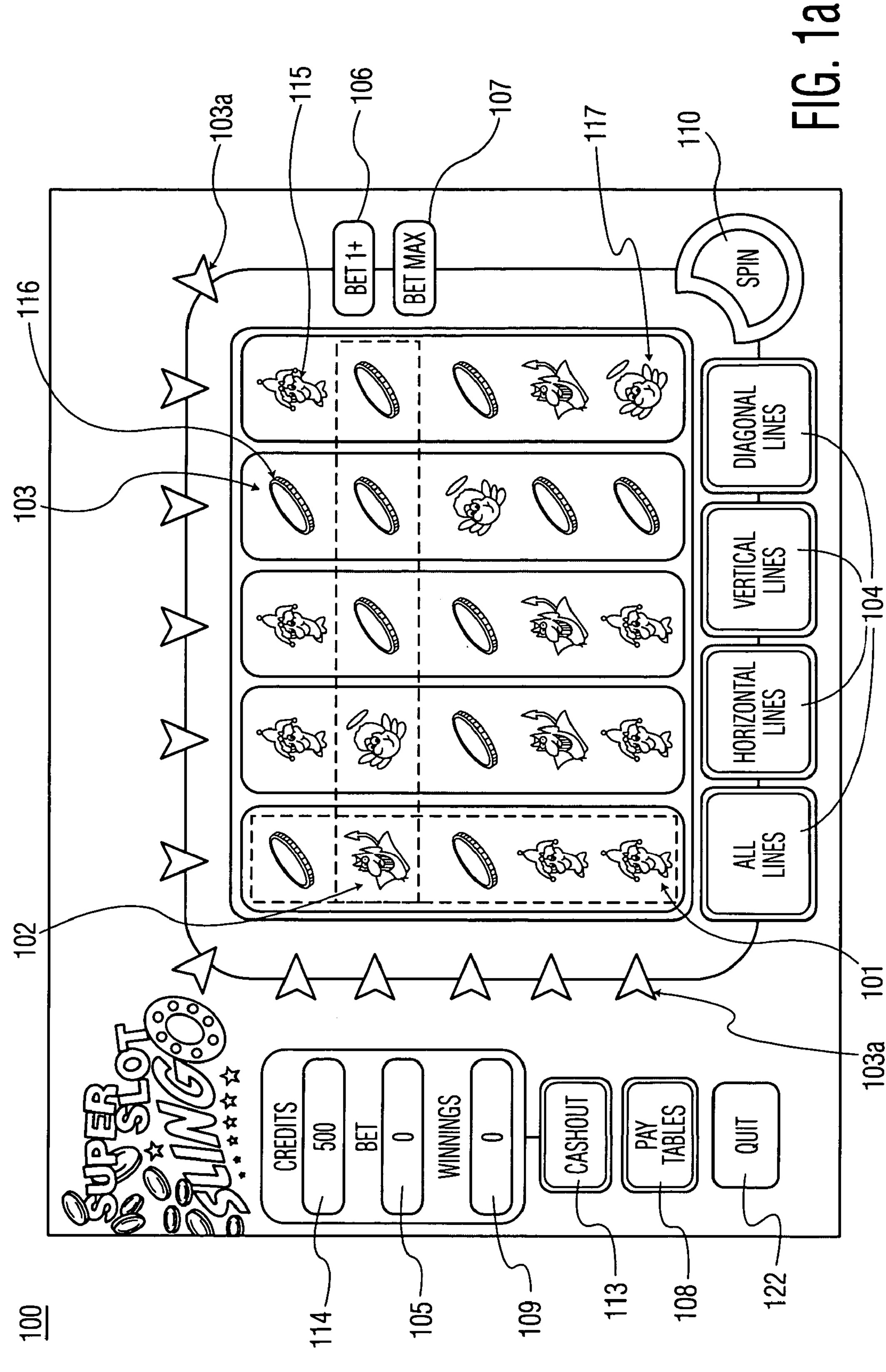
FIGS. 1*a–k* are illustrations of various stages of game play of an embodiment of a game in accordance with the present invention.
Figure 1B:
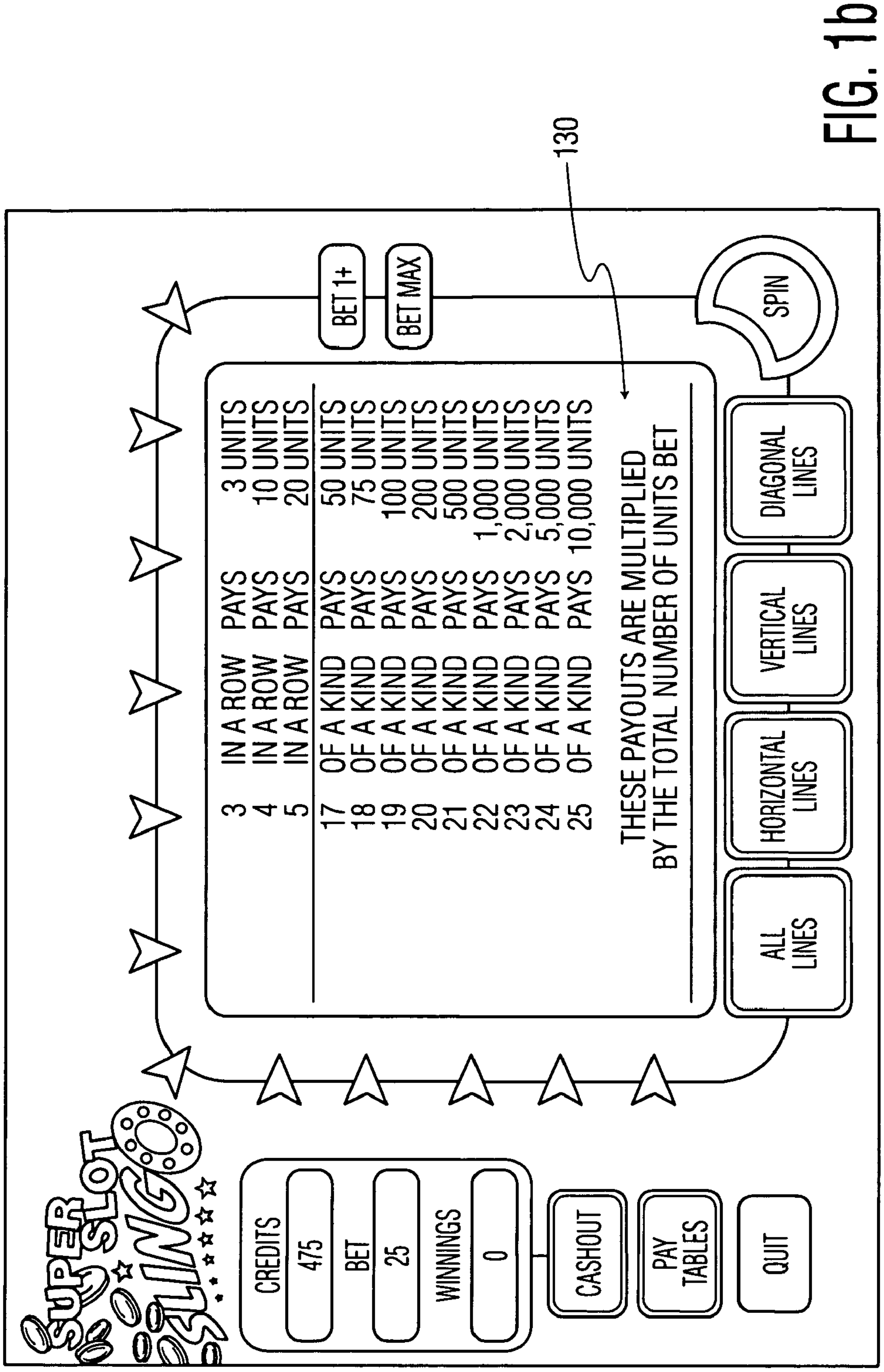
Figure 1C:
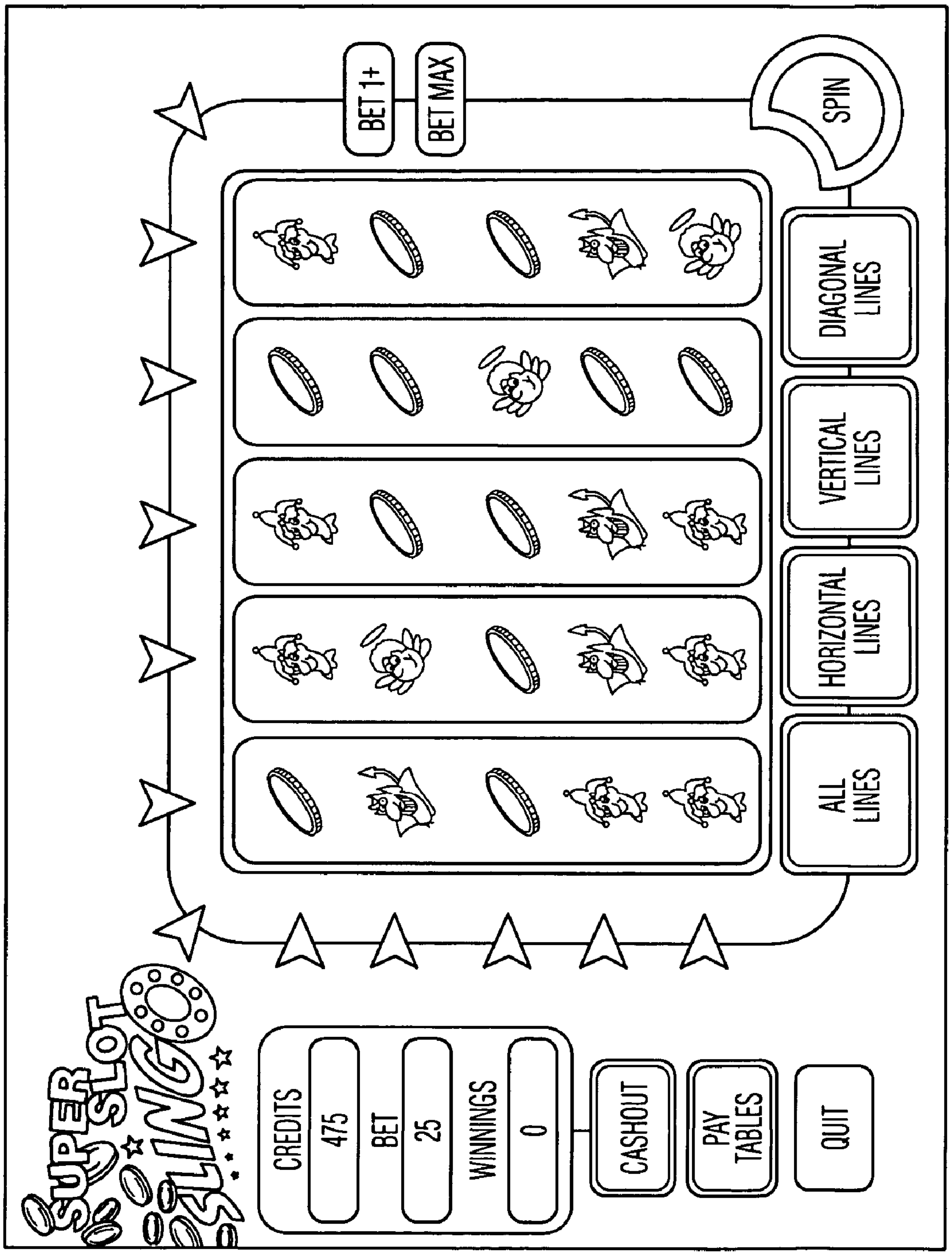
Figure 1D:
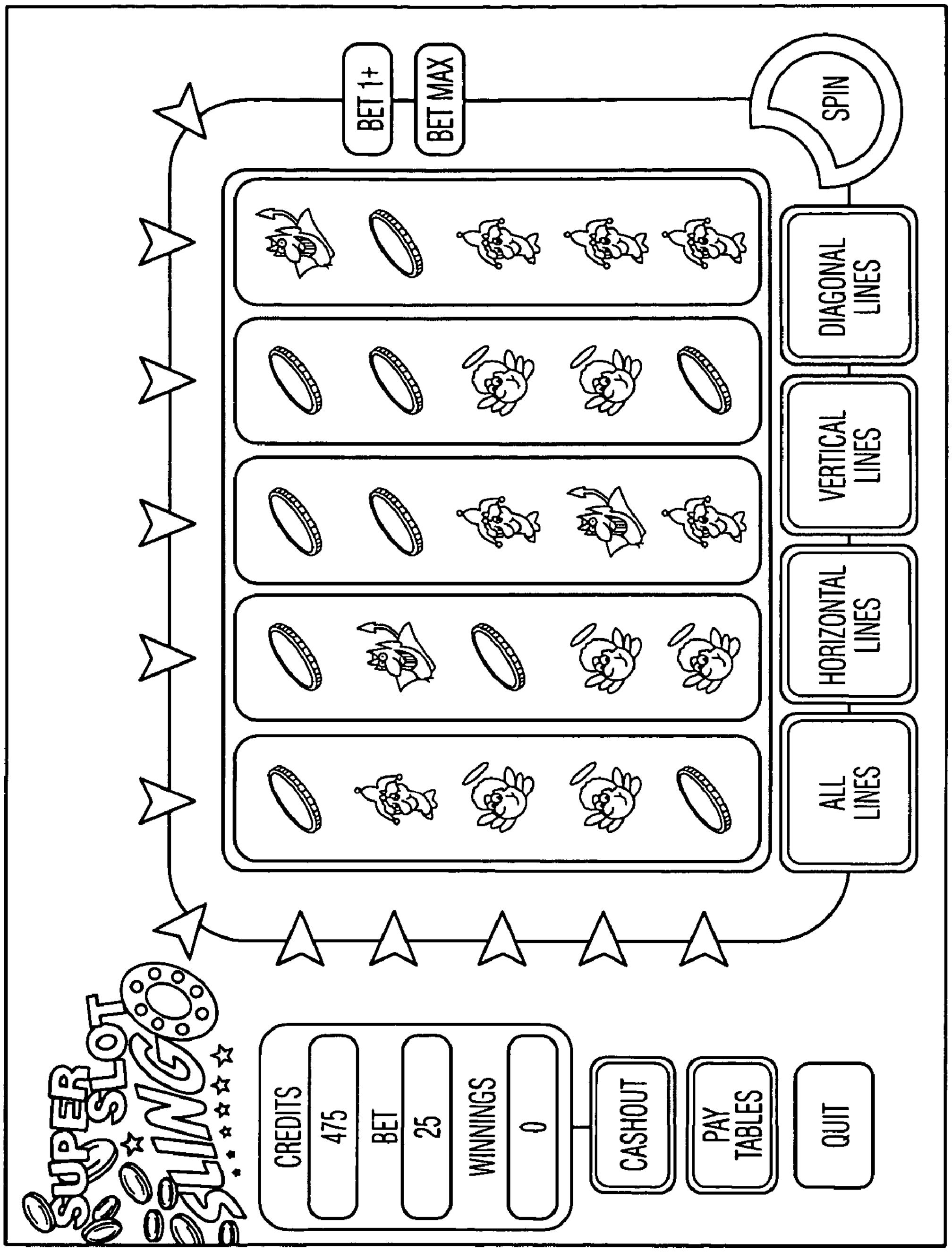

The game is played in accordance with the current example are as follows:

1. The player initiates a game by placing a bet. In the current example, the bet is paced by activating bet selection buttons 106 and 107 for selecting a unit amount bet per line (horizontal, vertical, and/or diagonal lines) of between 1 and 5 units where bet selection button 106 increments the bet by 1 unit per activation, and bet selection button 107 increments the bet to a predetermined maximum number of units (e.g. 5 units in the present example). A payment or betting account may be required from the player before a bet can be placed, as in the case of Internet play.
2. The player next selects the lines to be played by selecting one or more betting-line buttons 104. The player may choose to bet on the set of diagonal, horizontal and/or vertical lines. It is contemplated that other 'line' configurations may be provided for betting upon. Such 'line' configurations may include a selection of non-contiguous cells, such as corners and/or a central cell of the grid of cells. The overall objective is to place bets on one or more lines that will produce winning combinations according to a predefined pay table 130 as shown in FIG. 1*b*.
3. The player initiates a spin operation by activating the Spin button 110. Each cell 103 includes a variety of icons. In the preferred embodiment of the present invention as shown in FIGS. 1*a–k*, the variety of icons includes Jokers 115, Gold Coins 116, Cherubs 117 and Devils 102. The variety of icons as listed and associated quantities per cell are illustrative only; other embodiments of the present invention may use different icons, more or less icons and/or different quantities of each icon.

The spin operation causes random selection of one icon from the variety of icons for each cell 103. In the example provided, a random selection algorithm is computed, independently, for selecting an icon for each cell 103. The selected icon for each cell 103 is displayed on the GUI 100.

In other embodiments, the cells 103 may be grouped into multiple columns, rows, etc. Each group includes a variety of icons in accordance with design choices. The random algorithm is performed independently on each group. In this way, for example, an entire column of cells may be spun, with each column being spun independently. The order of icons of the variety of icons for the group may be fixed.

4. Winning conditions for the round are determined, and preferably computed, by determining if a predetermined condition exists for the selected line(s) bet upon, where the predetermined condition in the preferred embodiment is match icons displayed in each of the cells 103 included in the selected line(s). Such winning conditions may include, but are not limited to, 3-, 4- and 5-(of the same icons) in-a-line (rows, columns and diagonals), and n-of-a-kind, where n is preferably limited to 17 or more identical icons. All n number of identical icons must appear within the entirety of the selected groups. For example, if only one line of 5 cells 103 is selected, the n-of-a-kind winning condition cannot occur. In an alternate embodiment, any bet between one line and 12 lines can activate the payouts for n-of-a-kind.

In the current example, if a Devil 102 is displayed, lines containing the Devil 102 do not satisfy the predetermined condition. However, the Devil 102 has no effect on winning conditions of 17-of-a-kind and higher (see FIG. 1*b*).

5. Payout (e.g., a score, award points, cash amount, etc.) for the calculated winnings are calculated, and preferably computed, in accordance with a pay table, such as the pay table 130 shown in FIG. 1*b*. The player may view the pay table 130 at any time by activating the pay table button 108. The calculated payout is displayed in the winnings display 109 and added to the credits, which is preferably computed and displayed in the credit display 114.

Figure 1E:
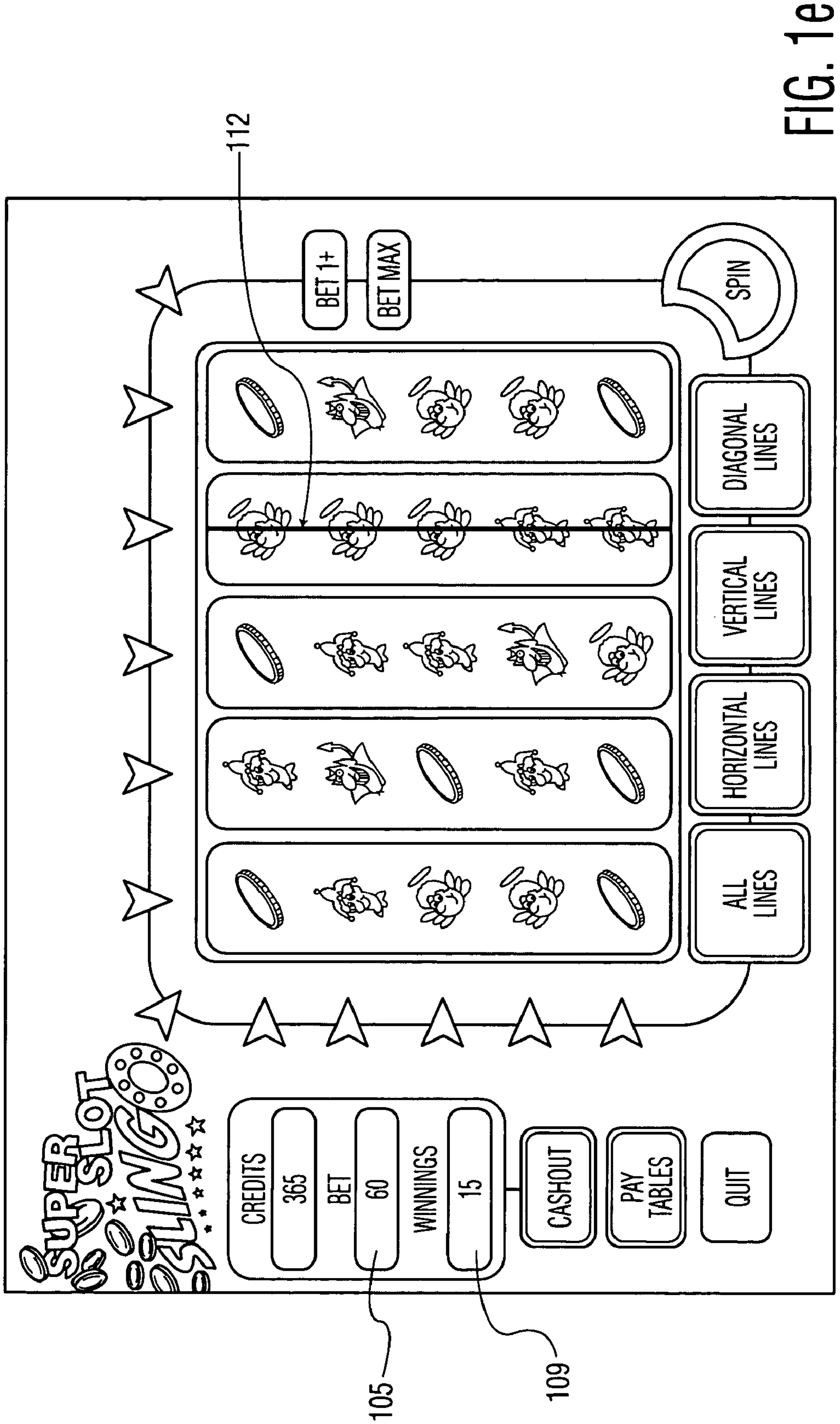
Figure 1F:
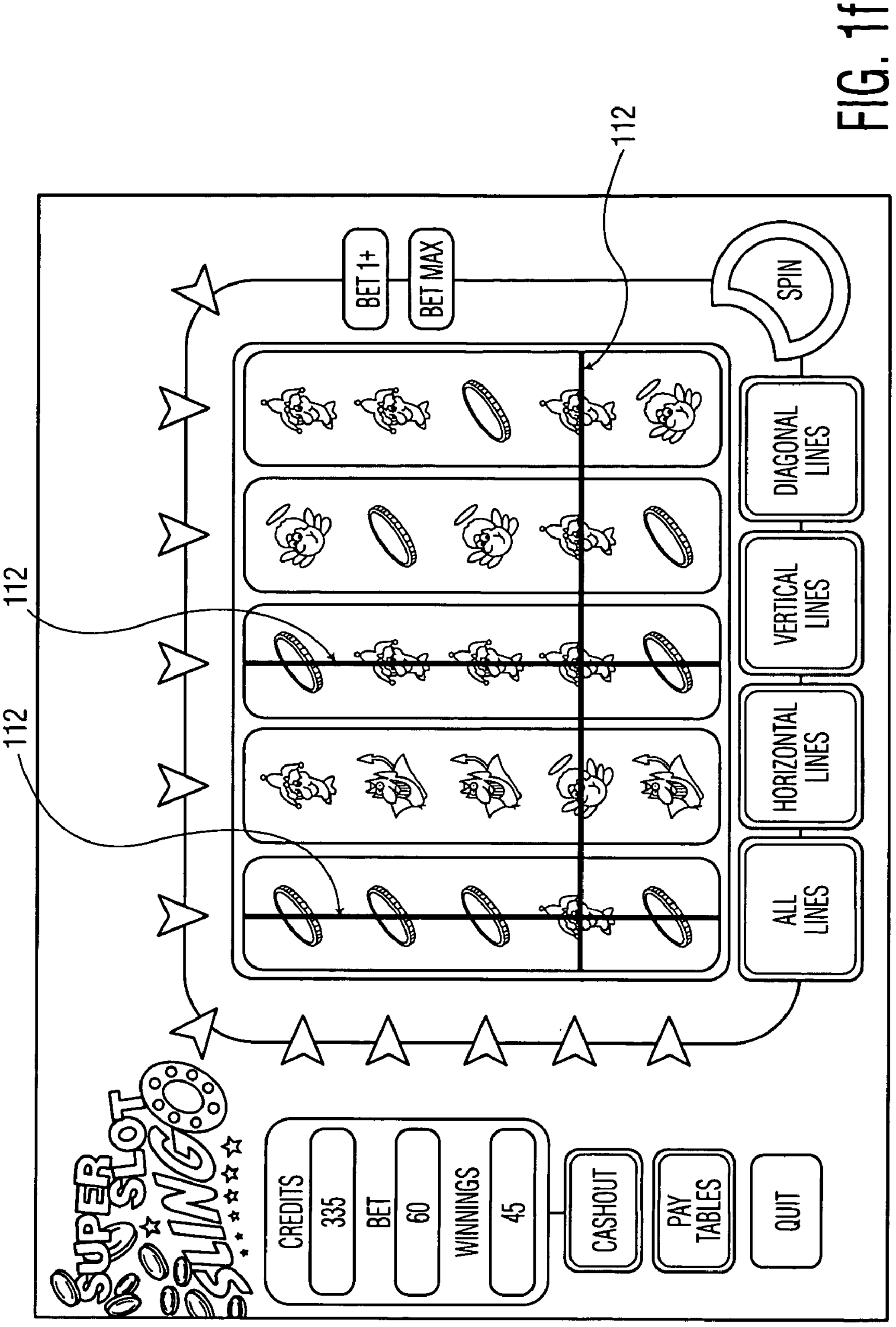
Figure 1G:
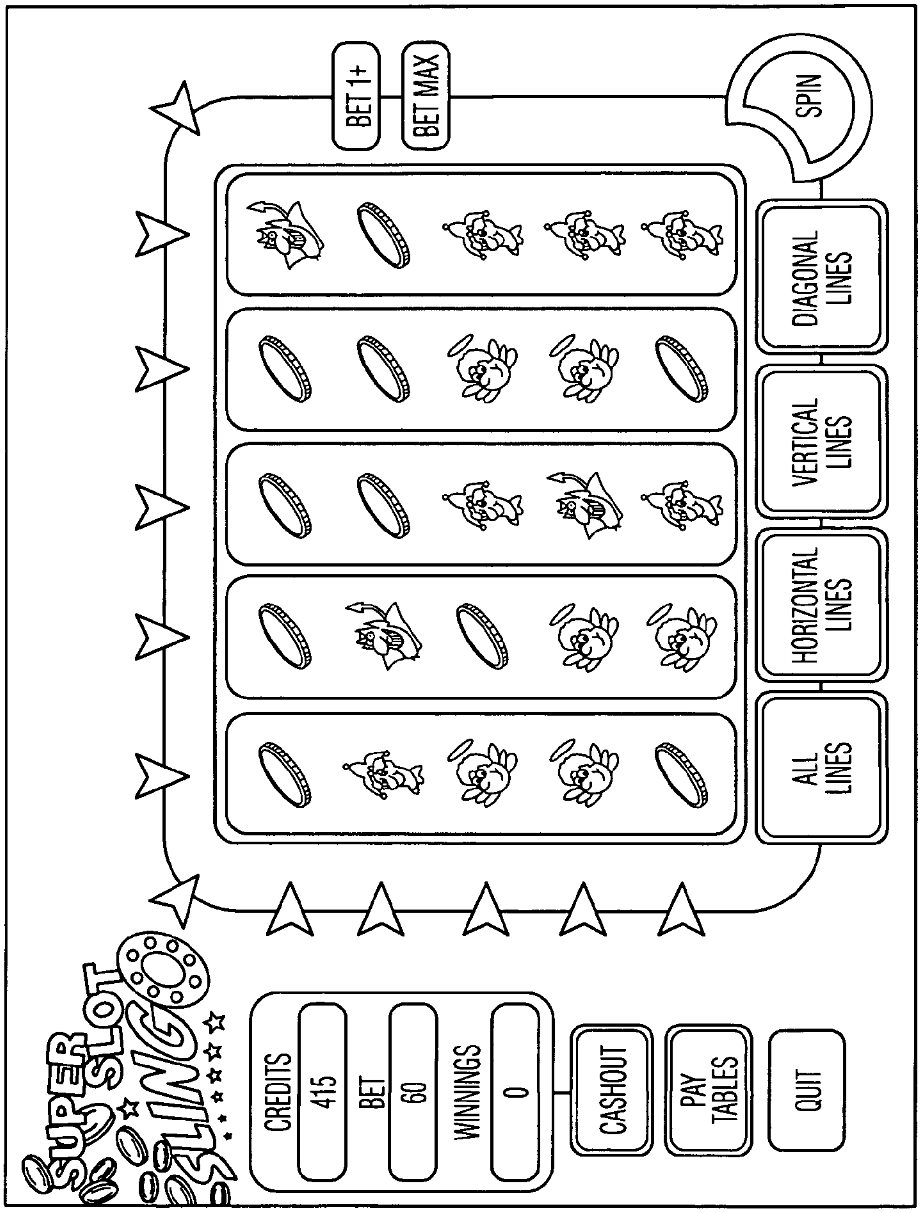
Figure 1H:
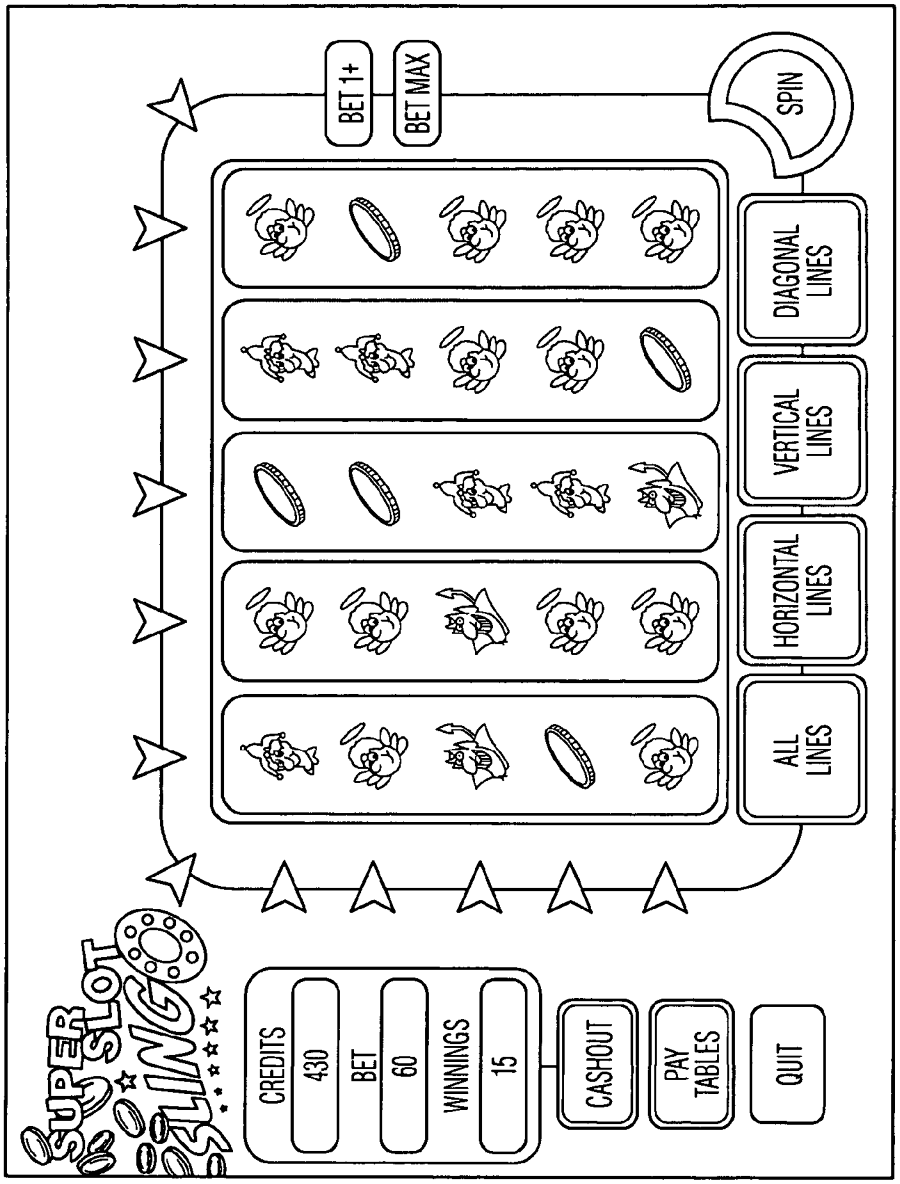
Figure 1I:
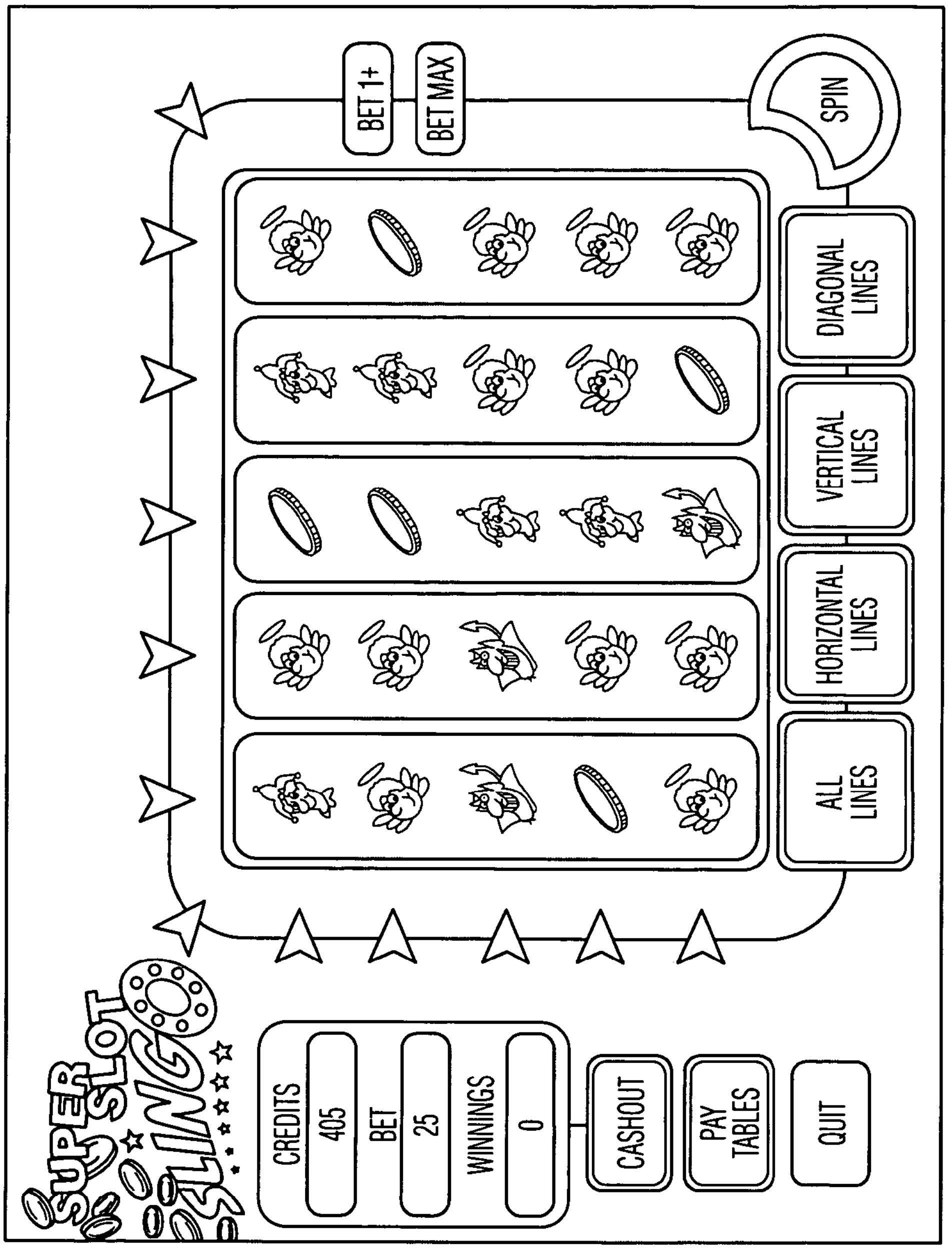
Figure 1J:
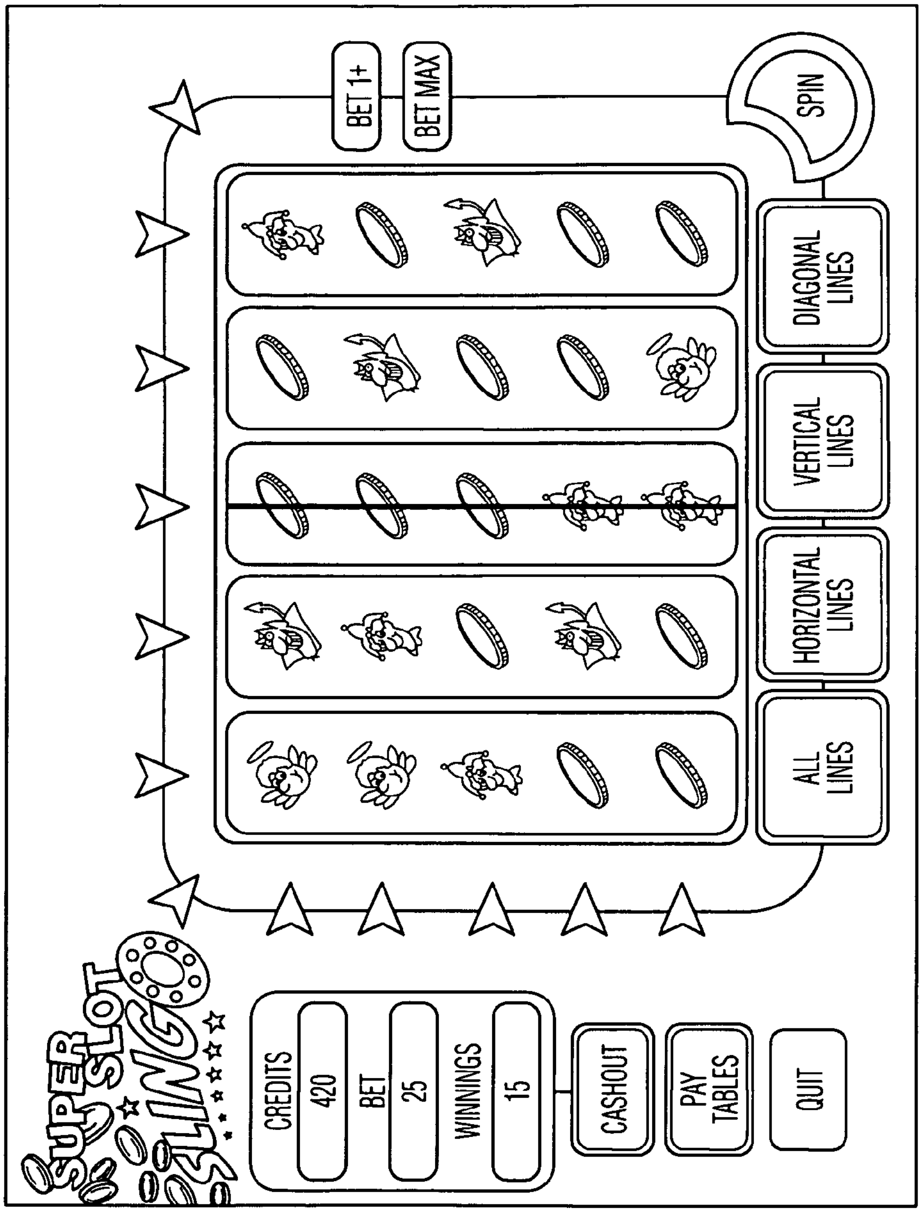
Figure 1K:
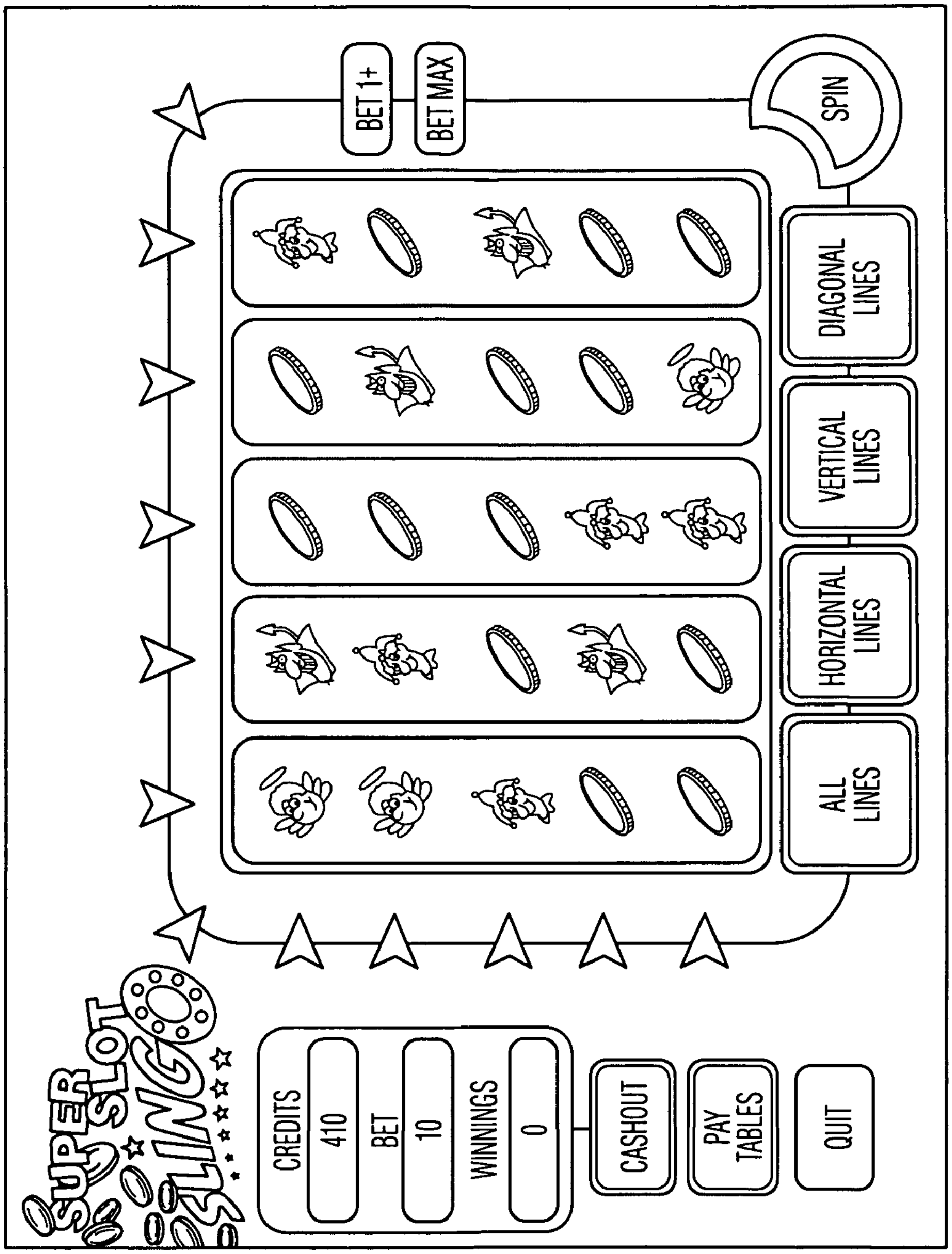

It should be noted that betting on more lines may result in achieving winnings 109 that amount to less than the total bet 105 (See FIG. 1*e*). For example: betting the maximum amount (5 units) on All lines requires 60 units, however if only one three-in-a-row appears, the winnings would amount to only 15 units according to the pay table (FIG. 1*b*), resulting in a net loss of 45 units. This feature adds an additional level of complexity and challenge to the game.

6. The player may claim payout winnings at any time by selecting the CashOut button 113, while the credits display 114 indicates total remaining credits.

7. Additional rounds may be initiated in the same manner as described above in step 1 and played according to the subsequent steps.

Figure 4:
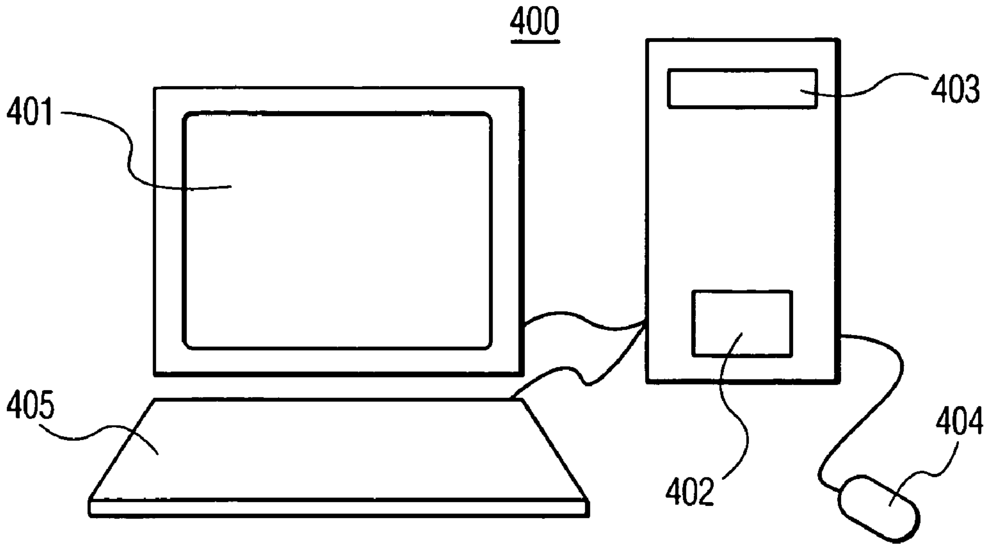
FIG. 4 illustrates a computer system for playing the game in accordance with the present invention.

The embodiment of FIG. 1 may be played on a computer system 400 as shown in FIG. 4. The computer system 400 includes a display device 401 (e.g., CRT, LCD, Plasma displays, etc.), at least one processor 402 configured for executing the steps of the present game as described above, storage device 403 for storing the game software for local game play, and one or more user input devices (e.g., mouse 404, keyboard 405, touch screen, voice recognition, etc.) allowing the player to direct game play. Additionally, a network connection 406 may also be provided for allowing network and/or Internet play, wherein the software for playing the game may be stored on a LAN (local area network) server or an Internet server. In the case of Internet game play, the game may be configured to accept credit card transactions for purchasing credits. Local game play may be configured with an initial predefined number of credits at the start of each game and neither requires nor accepts monetary transactions, thus the credits are strictly demonstrative of a score and not actually any monetary value.

Figure 2:
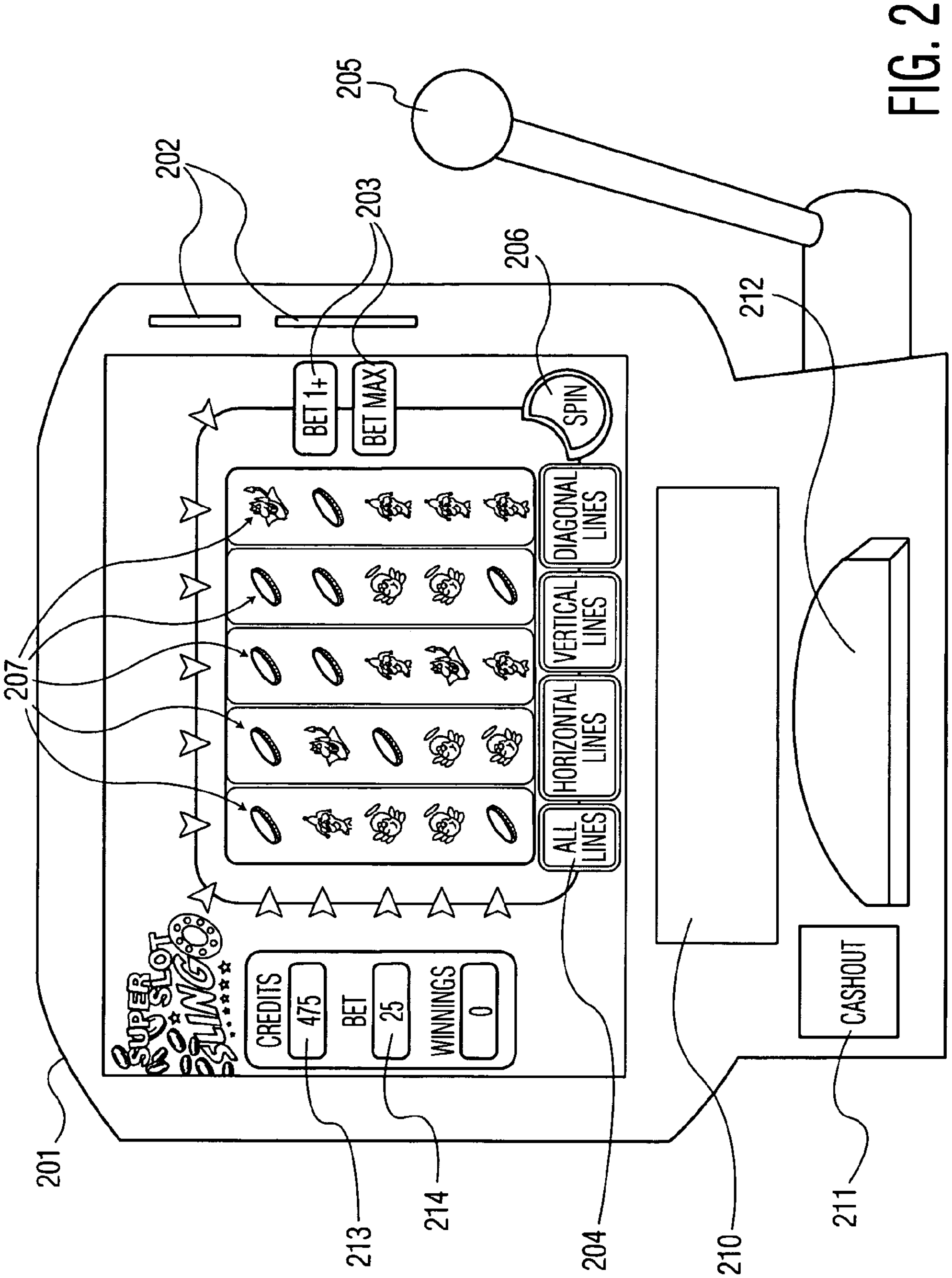
FIG. 2 is a schematic illustration of a slot machine device in accordance with the present invention.

FIG. 2 illustrates an alternate embodiment of the invention. The game is incorporated in a slot machine 201 with game play occurring within a casino or other gaming establishment. Game play is initiated by the player inserting a predetermined number of tokens, swiping a prepaid card, or other form of payment into the proper slot 202. The credits display 213 displays the amount of credits issued to the player, corresponding to a set credits-per-token policy. In each game round, the player, as stated above, is allowed to select betting-lines 204 and amount of the bet per line by actuation of the betting buttons 203. The same bet amount is wagered on each selected betting line 204, such that if 5 credits are bet and the two diagonal betting lines 204 are selected, then the total wagered amount is 10 credits and would be indicated as such in the bet display 214. Upon completion of the betting process, the player may activate a spin for the game round by either pulling the lever 205 or pressing the "Spin" button 206, at which point, the slot machine 201 activates the spinners 207. Alternatively in a video slot machine embodiment, the spinners are not physically present and therefore a random selection algorithm, as discussed above, and a graphical representation of the spin outcome are used in place of the spinners 207. As in the previous embodiment, winning conditions are obtained by correctly betting on the lines 204 that contain matching icons as specified by the PayOut card 210. Payouts are calculated by a processor and are based on the posted Payouts card 210.Winnings are cashed out when the player presses the "CashOut" button 211, attains a predetermined maximum score or has played a predefined maximum number of rounds and/or games. The payouts are deposited into the cash out bin 212, credited onto the players account card or provided to the player in some other appropriate method.

Various support components are not shown, but understood to be part of conventional video slot machine devices of the type indicated here, and therefore components of this embodiment. These components include one or more processors to handle the task of managing the player's account, winnings, and bets as well as overall game play; a means for receiving payment and providing payouts to the player, i.e. an internal cash out vault containing monies or tokens to be used to cash out the player, some means for applying winnings to a player account, etc., the method and means for processing wagers made through the use of an account card inserted into a card slot, an user input device for receiving a player's inputs, a display device for displaying the game's graphical user interface (GUI), and a candle or other such apparatus for signaling a Jackpot winner, i.e. a maximum amount winner.

Figure 3A:
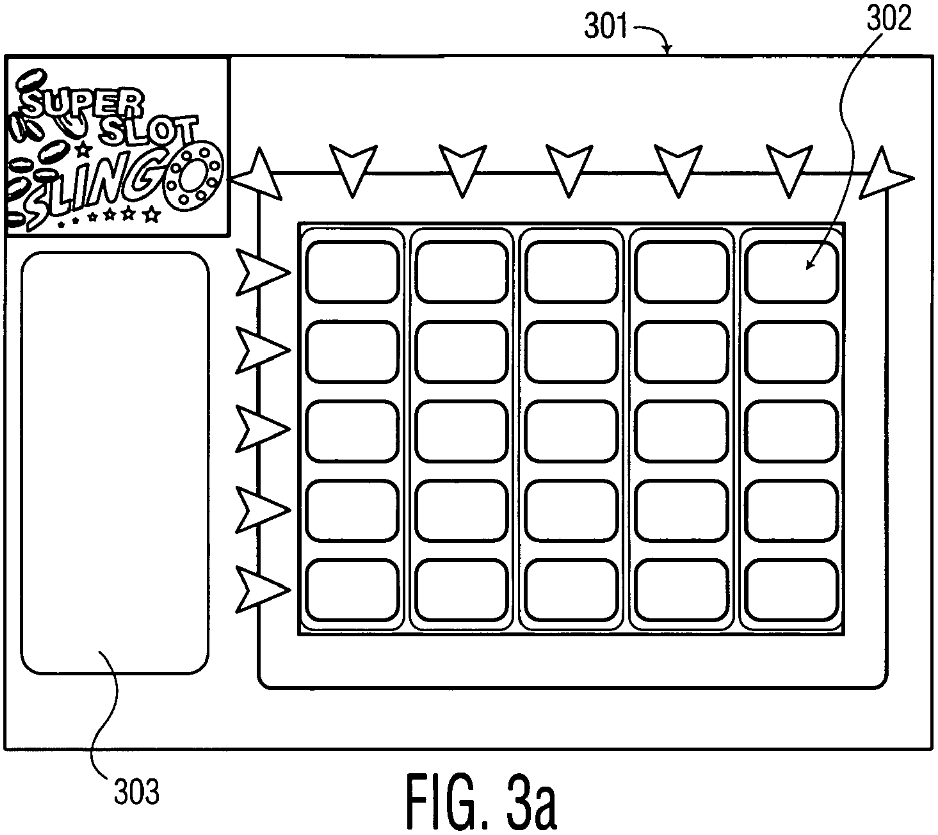
FIGS. 3*a–b* illustrate a lottery card embodiment of the game in accordance with the present invention.
Figure 3B:
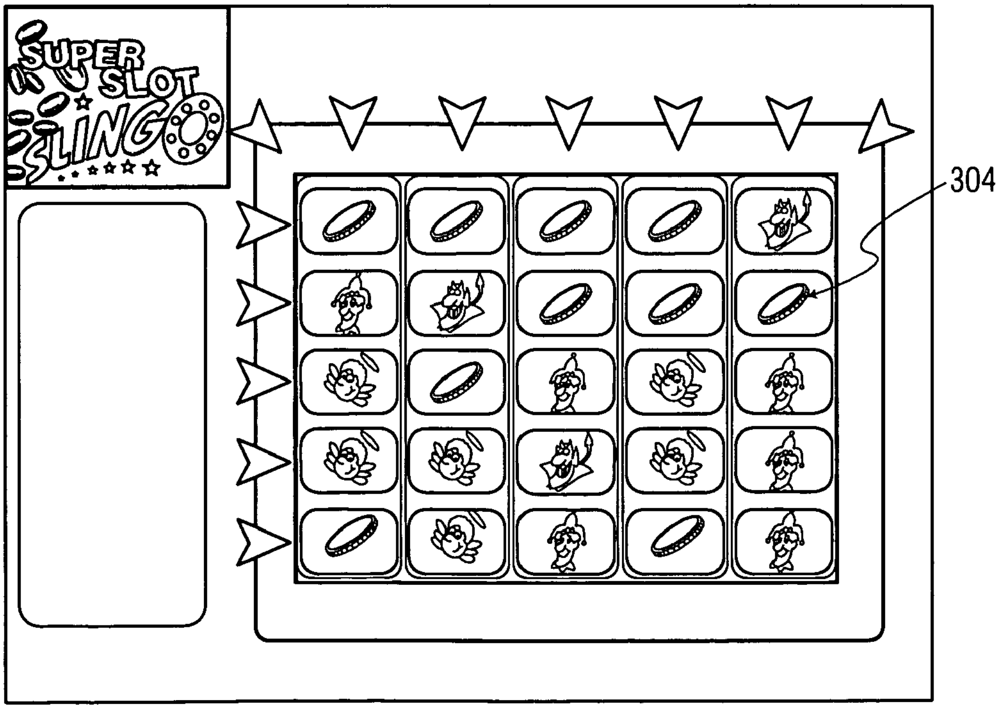

Another embodiment of the present invention is a lottery card as shown in FIG. 3*a* and FIG. 3*b*. The exemplary lottery card 301 is of the "Scratch-'n'-Win" type lottery games offered by many states. The lottery card 301 has a number of scratch cells 302, which cover icons 304. The lottery card embodiment is played by scratching of the scratch cells 302 to reveal the underlying icons 204. As in the previously described embodiments, winning conditions include the occurrence of revealing a predetermined minimum number of identical icons in a given row. This embodiment differs from the previous embodiment in that a player cannot choose which lines to play, instead all lines are played. The payouts may be based on whether a winning condition occurred in a horizontal, vertical or diagonal line as well as the number of identical icons in the winning line. More than one winning condition may occur on the lottery card 301, in which case, payout would equal the total from all the winning conditions obtained. Choices may be provided to the player upon purchase of the lottery card 301, such as betting line selection, difficulty level, etc. As described above, the Devil icons negate winning conditions in the lines in which they are revealed, but have no effect on a winning condition occurring by revealing a predetermined number of identical icons in the overall grid. The various payout conditions and game rules are printed in the rules area 303.

In an alternate embodiment of the lottery card, the player elects which lines (vertical, horizontal, diagonal and all lines) that he desires to base his winning or loss status at the time of purchase. In this embodiment, another set of four cells are provided alongside, above or below the grid. Each of the four cells corresponds to the lines the player desires to base his winning or loss status. At the time of purchase, the player informs the vendor which lines of the grid he desires to base his winning or loss status and the vendor marks with a writing instrument one of the four cells corresponding to the player's choice. The card is then presented to the player for scratching off and revealing the cells of the grid. If one or more of the selected lines have a predetermined minimum number of identical icons, then the player can present the lottery card and be paid his winnings.

It is contemplated that the cost of the lottery card is more if the player desires to base his winning or loss status on all the lines of the grid than if the player desires to base his winning or loss status on the vertical and horizontal lines. The cost of the lottery card is the least if the player desires to base his winning or loss status on the diagonal lines of the grid.

Figure 5:
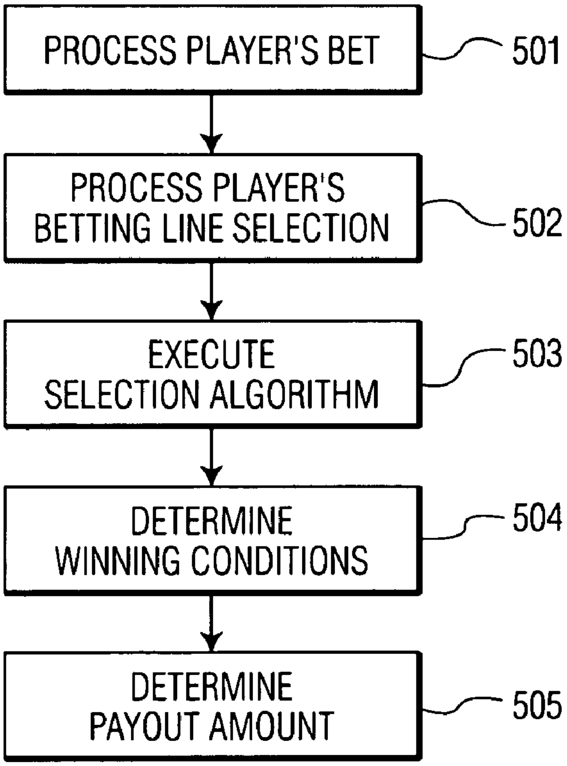
FIG. 5 illustrates the steps for playing the game in accordance with the present invention.

Referring to FIG. 5, in an embodiment of the present invention, a processor 402 processes a player's bet in step 501. The processor 402 follows with processing of the player's selection of betting line(s) in step 502. In step 503, the processor 402 executes a random selection algorithm for each of the cells and displays the selected icons in the cells. The processor 402 determines if a winning outcome has occurred in step 504 and a payout amount is determined in step 505. These steps are repeated until the player either ends game play or no longer has enough credits to initiate a new round of game play.

A further embodiment of the present invention is a computer-readable medium containing a set of programmable instructions capable of being executed by at least one processor for enabling play of the game via a computing device having a display.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A method for playing a game comprising the steps of:

displaying a play area containing a game board having a plurality of cells arranged in a grid having a plurality of rows and a plurality of columns, said grid defining a plurality of betting lines;

accepting a selection from a player of at least one of the plurality of betting lines;

randomly selecting and displaying an icon from a set of icons for each of said plurality of cells;

determining whether a predetermined minimum number of identical icons are displayed on at least one selected betting line;

determining whether a predetermined minimum number of identical icons are displayed by said grid; and calculating a score based on a predetermined scoring table in accordance with said determining steps.

2. The method as in claim 1, further consisting of providing for playing multiple consecutive games, wherein said score is cumulative.

3. The method as in claim 1, wherein said plurality of betting lines are selected from the group consisting of horizontal lines equal to the number of rows, vertical lines equal to the number of columns, and two diagonal lines defined by said grid.

4. The method as in claim 1, further comprising the step of accepting a wager for the selected betting lines.

5. The method as in claim 1, wherein said game is incorporated into a slot machine.

6. The method as in claim 1, wherein the first determining step comprises the steps of:

determining whether a predetermined icon is displayed by said at least one selected betting line; and negating a winning condition for said at least one selected betting line displaying said predetermined icon.

7. The method as in claim 1, wherein the predetermined minimum number of identical icons displayed by said at least one selected betting line is at least three and the predetermined minimum number of identical icons displayed by said grid is at least 17.

8. A system for playing a game comprising:

means for displaying a play area containing a game board having a plurality of cells arranged in a grid having a plurality of rows and a plurality of columns, said grid defining a plurality of betting lines;

means for accepting a selection from a player of at least one of the plurality of betting lines;

means for randomly selecting and displaying an icon from a set of icons for each of said plurality of cells;

means for determining whether a predetermined minimum number of identical icons are displayed on at least one selected betting line and whether a predetermined number of identical icons are displayed by said grid; and means for calculating a score based on a predetermined scoring table in accordance with said means for determining.

9. The system as in claim 8, wherein said plurality of betting lines are selected from the group consisting of horizontal lines equal to the number of rows, vertical lines equal to the number of columns, and two diagonal lines defined by said grid.

10. The system as in claim 8, further comprising means for accepting a wager for the selected betting lines.

11. The system as in claim 8, wherein said system is a slot machine having at least one processor capable of executing instructions for enabling play of said game.

12. The system as in claim 8, wherein the means for determining determines whether a predetermined icon is displayed by said at least one selected betting line; and said system further comprising means for negating a winning condition for said at least one selected betting line displaying said predetermined icon.

13. The system as in claim 8, wherein the predetermined minimum number of identical icons displayed by said at least one selected betting line is at least three and the predetermined minimum number of identical icons displayed by said grid is at least 17.

14. A computer readable medium comprising a set of computer readable instructions capable of being executed by at least one processor for playing a game comprising the steps of:

displaying a play area containing a game board having a plurality of cells arranged in a grid having a plurality of rows and a plurality of columns, said grid defining a plurality of betting lines;

accepting a selection from a player of at least one of the plurality of betting lines;

randomly selecting and displaying an icon from a set of icons for each of said plurality of cells;

determining whether a predetermined minimum number of identical icons are displayed on at least one selected betting line;

determining whether a predetermined number of identical icons are displayed by said grid; and calculating a score based on a predetermined scoring table in accordance with said determining steps.

15. The computer readable medium as in claim 14, further consisting of providing for playing multiple consecutive games, wherein said score is cumulative.

16. The computer readable medium as in claim 14, wherein said plurality of betting lines are selected from the group consisting of horizontal lines equal to the number of rows, vertical lines equal to the number of columns, and two diagonal lines defined by said grid.

17. The computer readable medium as in claim 14, further comprising the step of accepting a wager for the selected betting lines.

18. The computer readable medium as in claim 14, wherein said game is incorporated into a slot machine.

19. The computer readable medium as in claim 14, wherein the first determining step comprises the steps of:

determining whether a predetermined icon is displayed by said ate least one selected betting line; and negating a winning condition for said at least one selected betting line displaying said predetermined icon.

20. The computer readable medium of claim 14, wherein the predetermined minimum number of identical icons displayed by said at least one selected betting line is at least three and the predetermined minimum number of identical icons displayed by said grid is at least 17.

* * * * *